(12) United States Patent
Maney et al.

(10) Patent No.: US 11,397,991 B1
(45) Date of Patent: Jul. 26, 2022

(54) SYSTEM AND METHOD TO REPLACE PERSONAL ITEMS

(71) Applicant: UIPCO, LLC, San Antonio, TX (US)

(72) Inventors: Will Kerns Maney, San Antonio, TX (US); Mark Paxman Warnick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 324 days.

(21) Appl. No.: 16/288,740

(22) Filed: Feb. 28, 2019

Related U.S. Application Data

(60) Provisional application No. 62/785,838, filed on Dec. 28, 2018.

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ..................................................... G06Q 40/08
See application file for complete search history.

(56) References Cited

U.S. PATENT DOCUMENTS

| | | | | |
|---|---|---|---|---|
| 5,021,676 | A * | 6/1991 | Dragon | B41J 9/46 250/223 R |
| 7,974,861 | B1 * | 7/2011 | Bohanek | G06Q 40/08 705/4 |
| 2005/0262147 | A1 * | 11/2005 | Lee | G06Q 30/06 |
| 2006/0224422 | A1 * | 10/2006 | Cohen | G06Q 40/08 705/4 |
| 2007/0106586 | A1 * | 5/2007 | Mack | G06Q 40/06 705/36 R |
| 2009/0187433 | A1 * | 7/2009 | Nudd | G06Q 40/08 705/4 |
| 2010/0039263 | A1 * | 2/2010 | Chen | G08B 13/1427 340/572.1 |
| 2011/0282697 | A1 * | 11/2011 | Fitzgerald | H04W 12/12 705/4 |
| 2012/0116823 | A1 * | 5/2012 | Vasavada | G06Q 10/10 705/4 |
| 2016/0117638 | A1 * | 4/2016 | DiSorbo | G06Q 10/083 705/333 |
| 2016/0180467 | A1 * | 6/2016 | Griffin | G06Q 40/08 705/4 |
| 2019/0356506 | A1 * | 11/2019 | Beach | G06K 9/00771 |

\* cited by examiner

*Primary Examiner* — Rajesh Khattar
(74) *Attorney, Agent, or Firm* — Plumsea Law Group, LLC

(57) ABSTRACT

A system for replacing a personal item is disclosed. The system can include a tag device attached or associated with a personal item, like a camera, portable computer, tablet or bicycle. Once the personal item loses connection with a home network, the system can designate the personal item as being missing, and in some cases issue a dynamic insurance policy. If the personal item is then lost or stolen, a service provider can determine the loss of the personal item and send a replacement item.

16 Claims, 12 Drawing Sheets

SYSTEM AND METHOD TO REPLACE PERSONAL ITEMS

CROSS-REFERENCE TO RELATED APPLICATIONS

This application claims the benefit of the U.S. Provisional Patent Application Ser. No. 62/785,838, filed Dec. 28, 2018, for "System and Method to Replace Personal Items," naming Will Kerns Maney et al. as inventors, the entirety of which is hereby incorporated by reference.

TECHNICAL FIELD

The present disclosure generally relates to a system for replacing personal items, and in particular, to a system of dynamically issuing insurance policies to portable or transportable personal items.

BACKGROUND

Homeowner's insurance policies have been available. These policies typically cover loss or damage to a premises and in some cases, also cover personal property. However, the process of obtaining insurance can be time consuming and difficult. Also, when people are transient, moving often from one location to another location, like college students, traditional homeowner's or renter's insurance policies can be difficult to obtain quickly and to move from one location to another location. Also, the claims process can sometimes be difficult or time consuming if a crucial personal item, like a laptop computer, is lost. There is a need for a new kind of insurance paradigm that addresses these shortcomings.

SUMMARY

In one aspect, a system for replacing a personal item is disclosed. The system can include a tag device associated with the personal item and a home network that communicates with the tag device. The home network can have a network boundary, the network boundary defining a communication limit of the home network. The system can infer a relative position of the personal item by sensing the tag device. The system infers that the personal item is within the network boundary of the home network if the home network can communicate with the tag device; and the system infers that the personal item is beyond the network boundary of the home network if the home network is incapable of communicating with the tag device. The system designates the personal item as being lost or stolen if the tag device fails to communicate with the home network; and the system sends a replacement item if the personal item has been designated lost or stolen and a claim has been made with the system.

In another aspect, a method for replacing a personal item is disclosed. The method can include steps of associating a tag device with the personal item; communicating with the tag device on a home network, the home network having a network boundary, the network boundary defining a communication limit of the home network; determining, by a processor, a relative position of the personal item by sensing the tag device; determining, by a processor, that the personal item is within the network boundary of the home network if the home network can communicate with the tag device; and determining, by a processor, that the personal item is beyond the network boundary of the home network if the home network is incapable of communicating with the tag device; designating, by a processor, that the personal item is lost or stolen if the tag device fails to communicate with the home network; and sending a replacement item if the personal item has been designated lost or stolen and a claim has been received.

In another aspect, a system for replacing a personal item is disclosed. The system can include a tag device attached to the personal item; a home network communicating with the tag device; an application running on a mobile device; the application receiving information from a service provider; the service provider receiving information related to the tag losing communication with the home network; and wherein the service provider designates the personal item as missing; the service provider creating a list of missing items and sending the list of missing items to the application; the application displaying the list of missing items; the application receiving information related to a selection made by a user designating the personal item as being lost or stolen; the service provider receiving the information related to the selection made by a user designating the personal item as being lost or stolen; and the service provider sending a replacement item to the user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EMBODIMENTS

The embodiments provide systems and methods for providing dynamic insurance coverage for personal items. The term "dynamic" may refer to a system characterized by constant change. More specifically, the phrase "dynamic insurance" may refer to an insurance policy that provides coverage during predetermined periods of time.

The method includes a system application and components that allow personal items to connect to a designated network. When personal items are connected to the designated network, the insurance coverage is not activated, but when the personal items are not connected to the designated network, the insurance coverage is activated. The embodiment of the system application can recognize and record when personal items have not been reconnected to the designated network, therefore providing information about personal items that may have been lost or stolen. The system application can be utilized through a device that contains communication components to make an insurance claim for missing personal items. By using the system application, the insurance claim can be processed by a service provider and missing personal items may be compensated or replaced.

The embodiment of the system application provides a dynamic insurance policy for personal items. The insurance policy may provide coverage during select situations; therefore the system and method may reduce cost of an insurance policy for personal items of a user. Insurance policy costs may be reduced due to the user only paying for their personal items to be insured when the personal items are not connected to the designated network.

Figure 1:
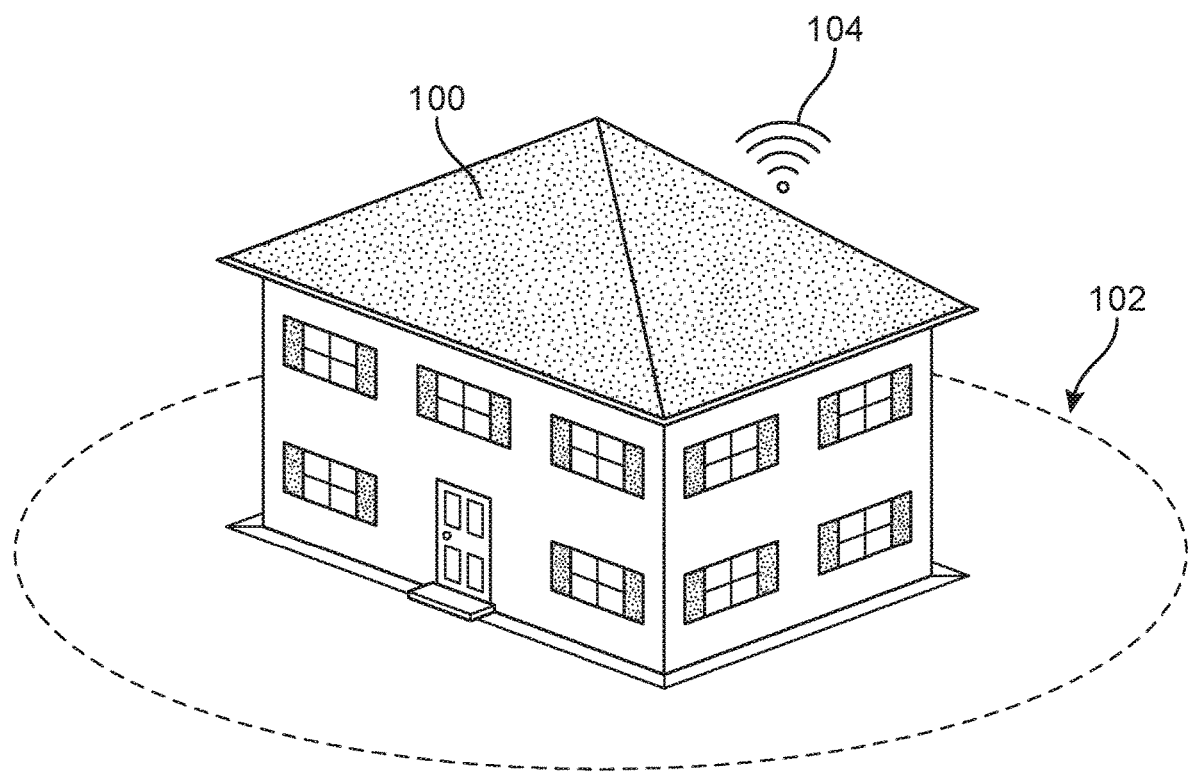
FIG. 1 is a schematic diagram of an embodiment of a house and home network boundary.

FIG. 1 is a schematic diagram of an embodiment of a house with a network and network boundary. In the present embodiment, house 100 can be any building or structure. House 100 may include components to provide a network and network connection. Examples of components that can provide a network connection may include a router or modem, a wired network connector or another module that may provide network connection.

In some embodiments, home network 104 associated with house 100 may be configured with a network boundary. In embodiments, home network 104 may provide a wired or wireless internet connection. In some embodiments, home network 104 may provide a wireless network connection within the proximity of home network boundary 102. As illustrated in FIG. 1, home network boundary 102 can define an endpoint of the internet connection provided by home network 104.

In other embodiments, home network 104 may provide a wired connection where the network connection may be provided by wired network components. Home network 104 also may not provide wired or wireless network connection outside of home network boundary 102. Referring to wired network connections, home network boundary 102 may be defined by the physical connection of the wired network components. For example, a device may be outside home network boundary 102 when disconnected from wired network components.

Figure 2:
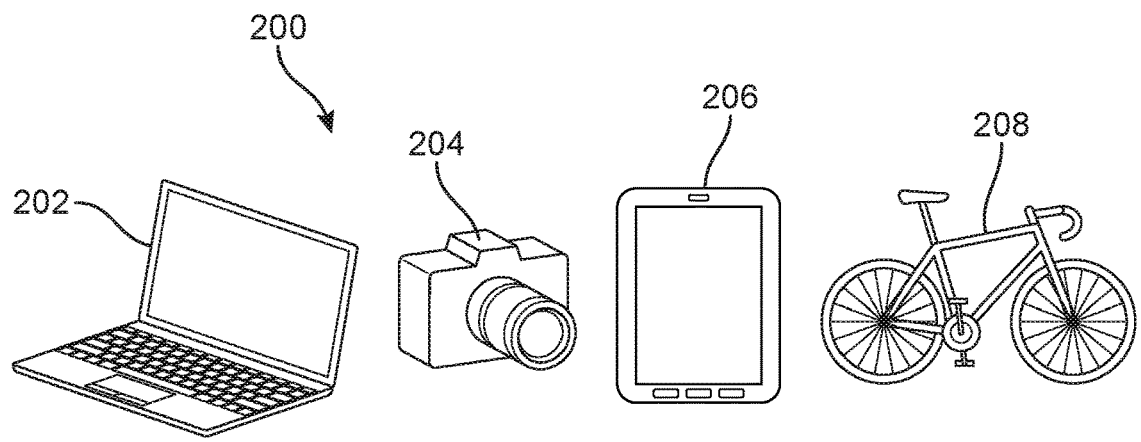
FIG. 2 is a schematic diagram of an embodiment of various personal items.

FIG. 2 is a schematic diagram of embodiments of various personal items. In some embodiments, personal items 200 may include items of moderate value that may be used on a daily basis. The term "moderate value" may refer to an item that holds significant monetary value that the user would find financially difficult to replace. In other embodiments, personal items 200 may include items of any value. Personal items 200 can include various different items or groups of items. In some embodiments, personal items 200 can be portable or transportable and may be utilized and operated in various locations. Examples of personal items 200 can include laptop computer 202, camera 204, for example, an interchangible lens camera, tablet 206, and bicycle 208.

Figure 3:
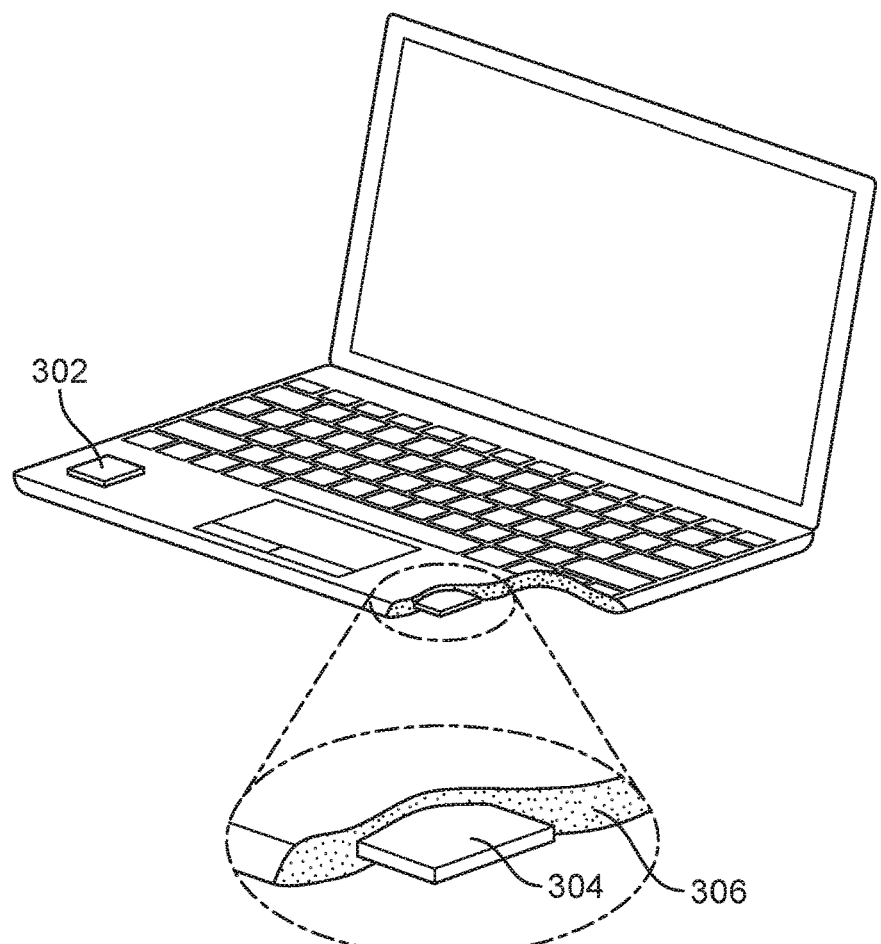
FIG. 3 is a schematic diagram of an embodiment of a wireless communications module associated with a laptop computer, showing both a cross-sectional view and an assembled view.

As shown in FIG. 3, some embodiments of personal items 200 may include components that facilitate wireless communication. FIG. 3 is a schematic diagram of an embodiment of various wireless communications modules associated with laptop computer 202. In different embodiments, the wireless communications module may be formed as a tag, chip or sensor-like package. As shown in FIG. 3, laptop computer 202 may include a wireless communications module as tag 302. Tag 302 may be located on the exterior surface of laptop computer 202. In this configuration, tag 302 is a discrete package that houses a wireless communications module.

In some embodiments, laptop 202 may include a wireless communications module formed as an integrated chip 304. As shown in FIG. 3, which includes an enlarged cutaway view of laptop computer 202, chip 304 is disposed within interior structure 306 of laptop computer 202. In this embodiment, wireless communications module may be integrated with or embedded within the integrated circuits of laptop computer 202. It should be understood that the other personal items, camera 204, tablet 206 and bicycle 208 also include some form of wireless communications module.

Figure 4:
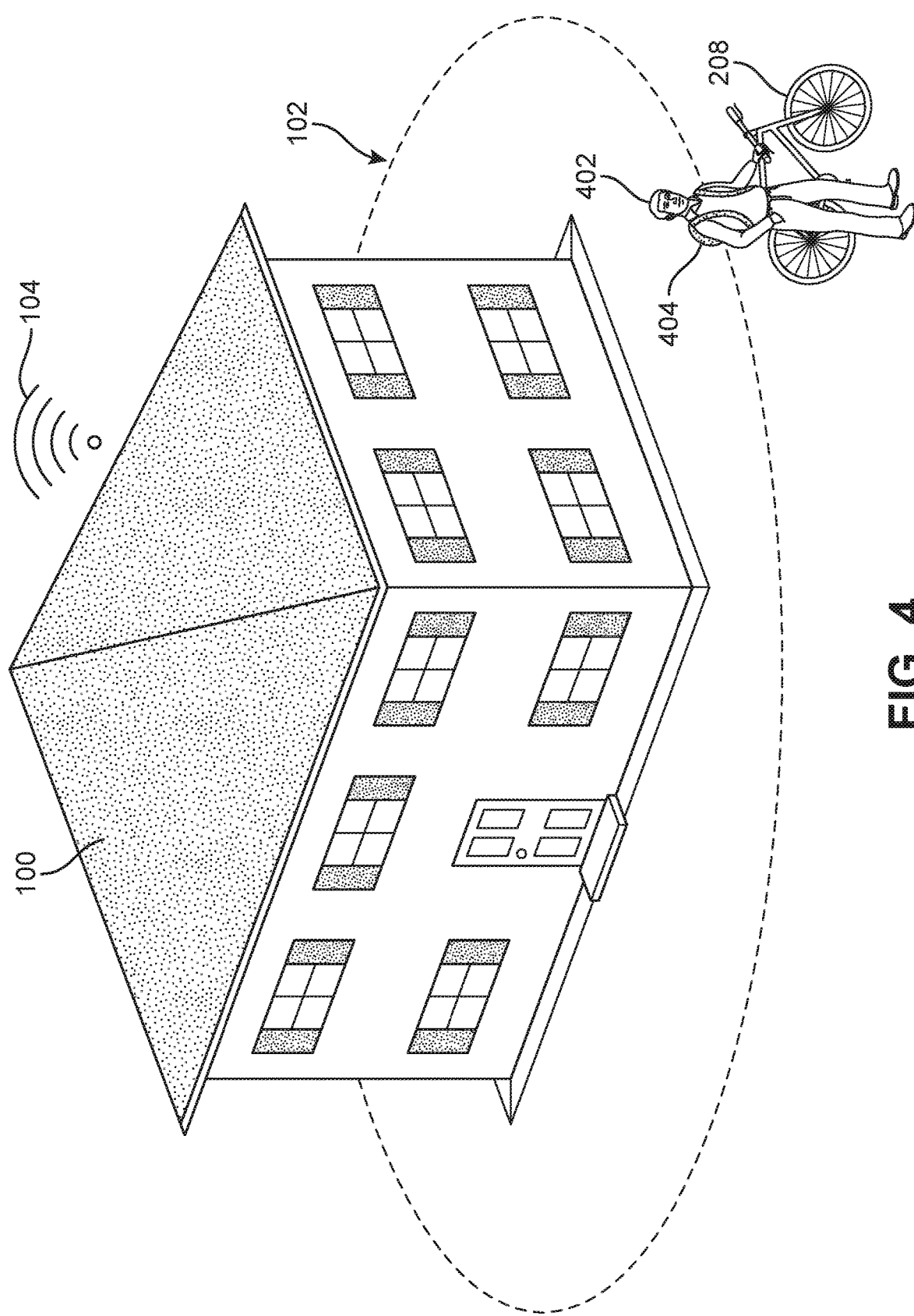
FIG. 4 is a schematic diagram of an embodiment of a person leaving a network boundary associated with a house.

In some embodiments, the wireless communications module may allow personal items 200 to associate and connect to home network 104 while located within home network boundary 102. As described above, personal items 200 may be portable and transportable, so personal items 200 may be utilized and operated in various different locations. In some situations, personal items 200 may operate in locations outside of home network boundary 102. FIG. 4 is a schematic diagram of an embodiment of a user exiting home network boundary 102 with various personal items. Bicycle 208 is explicitly shown in FIG. 4, however, it should be understood that various other personal items 200 may be in the user's backpack 404 and not visible in FIG. 4.

In some embodiments, user 402 may leave house 100 and home network boundary 102 for various reasons where user 402 may be required to bring personal items 200. As shown in FIG. 4, user 402 exits network boundary 102 with personal items 200 within backpack 404 and bicycle 208. This causes home network 104 to lose connection with personal items 200 after user 404 exits home network boundary 102.

Figure 5A:
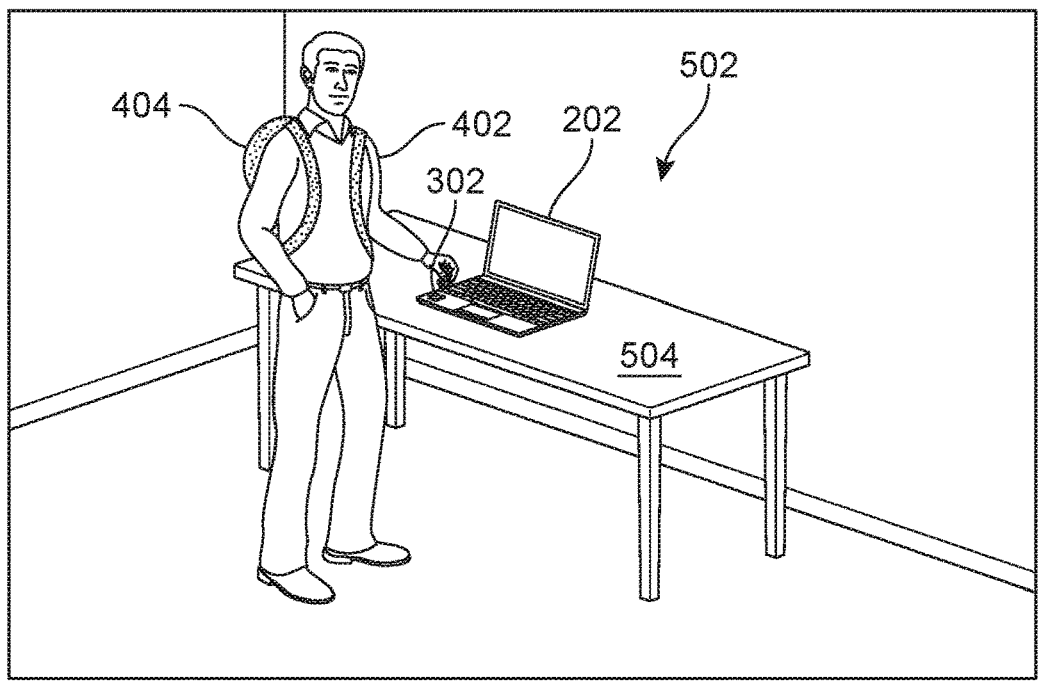
FIG. 5A is a schematic diagram of an embodiment of a person using a laptop computer.

FIG. 5A is a schematic diagram of an embodiment of user 402 using laptop computer 202 in work location 502. In embodiments, work location 502 may include any location that is located away from house 100, home network 104 and home network boundary 102. User 402 may operate laptop computer 202 in various places associated with work location 502 but referring to FIG. 5A, user 402 operates laptop computer on top of table 504. In some embodiments, user 402 may bring backpack 404 to work location 502 where backpack 404 may contain other personal items 200 such as DSLR camera 204 and tablet 206 (not visible in FIG. 5A).

Figure 5B:
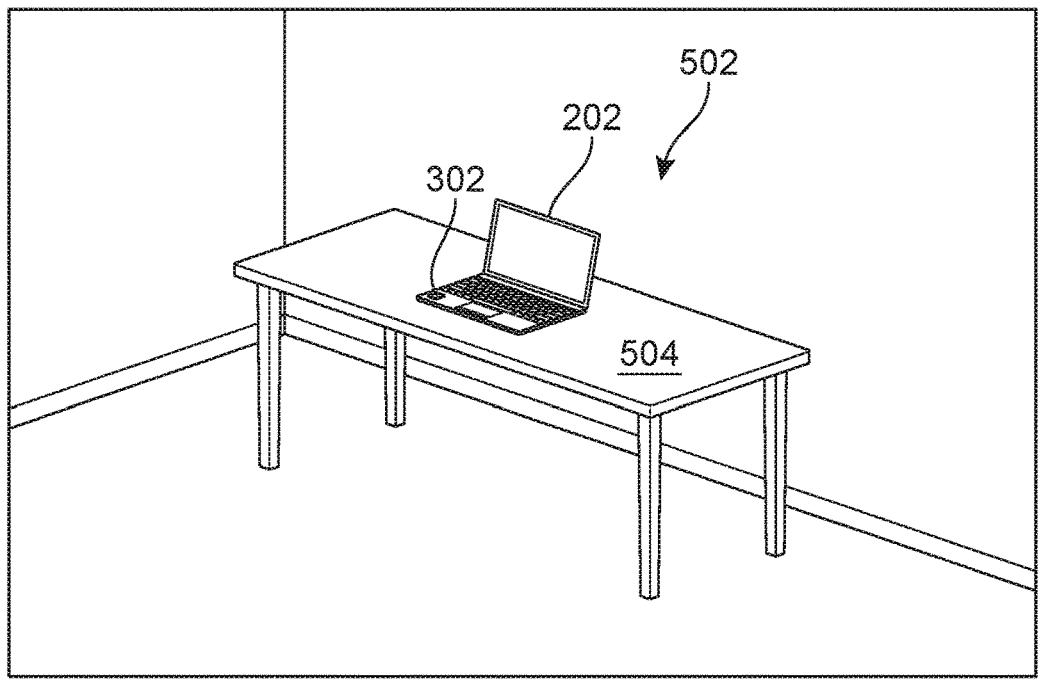
FIG. 5B is a schematic diagram of an embodiment of a person exiting the premises where a personal computer is located.

FIG. 5B is a schematic diagram of an embodiment of work location 502 where user 402 has exited the location and laptop computer 202 has been left on table 504. In some embodiments, user 402 can leave work location 502 with personal items 200. In other embodiments, user 402 may leave work location 502 with some, but not all personal items 200. For example, as shown in FIG. 5B, user 402 with backpack 404 is no longer present at work location 502 while laptop computer 202 is located on table 504. Referring to this scenario, laptop 202 can be considered "lost," meaning user 402 no longer has possession of or knowledge of the location of laptop 202. In other embodiments, other personal items 200 may be left behind at work location 502 with, or instead of, laptop computer 202.

Figure 6:
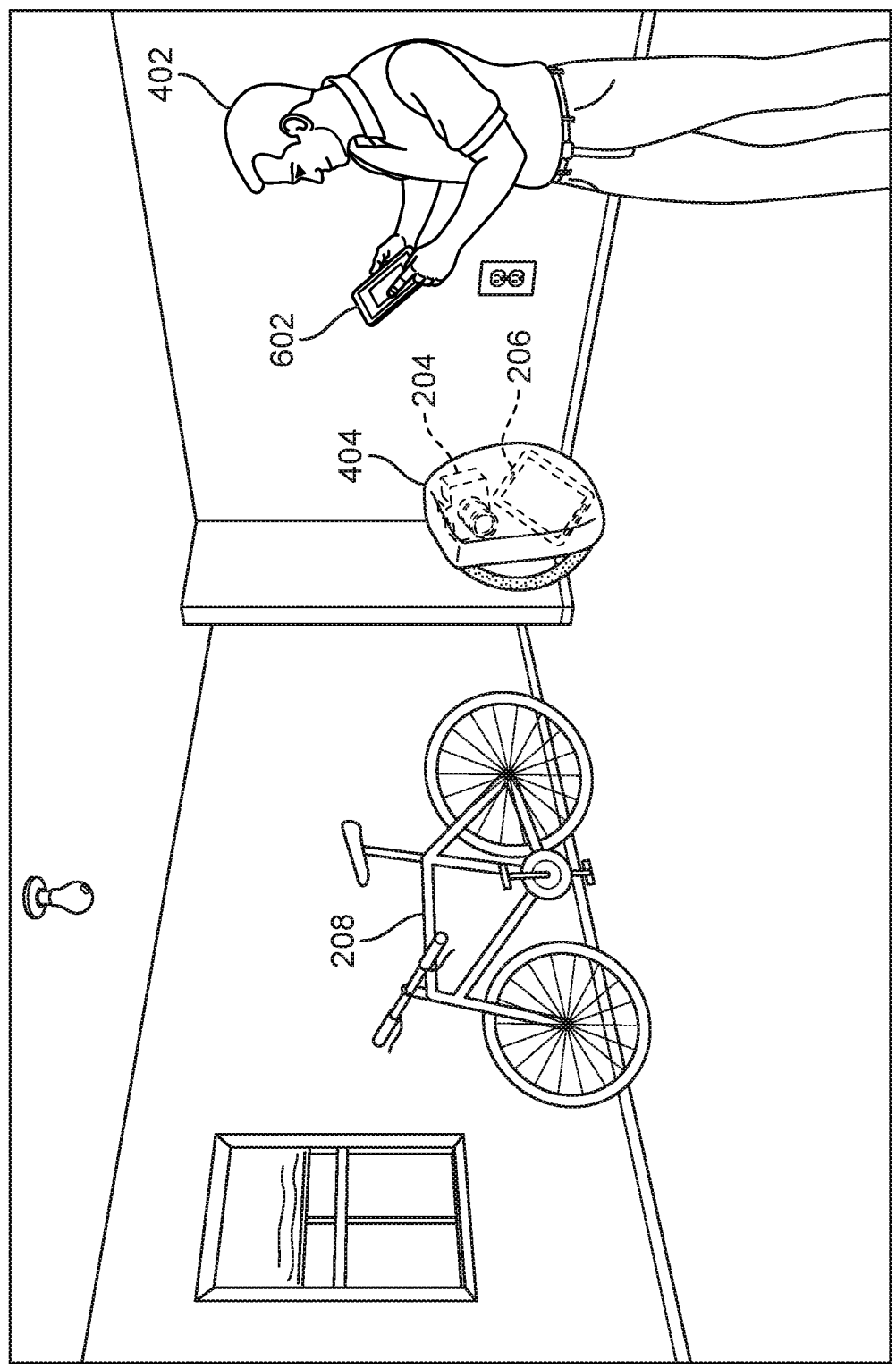
FIG. 6 is a schematic diagram of an embodiment of a person operating a system application through a mobile device.

FIG. 6 illustrates an embodiment of user 402 and personal items 200 within the entrance of house 100. After a period of time, user 402 may re-enter home network boundary 102 and house 100, where personal items 200 can reconnect with home network 104. As shown in FIG. 6, backpack 404 containing DSLR camera 204 and tablet 206, and bicycle 208 can reconnect with home network 104. In this example, other personal items 200 may not reconnect with home network 102. For example, referring to FIG. 6, laptop computer 202 is not present; therefore laptop 202 may not be located within network boundary 102 and cannot reconnect with home network 104.

FIG. 6 is also a schematic diagram of an embodiment of user 402 operating a system application through mobile device 602. Mobile device 602 may include components to connect with home network 104. In other embodiments user 402 may access the system application through other devices that include components to connect with home network 104. In some embodiments, mobile device 602 may utilize the system application to recognize which personal items 200 are connected and not connected with home network 104. By tracking the location of personal items 200, the system application can provide dynamic insurance coverage and can replace personal items that have been lost or stolen.

Figure 7:
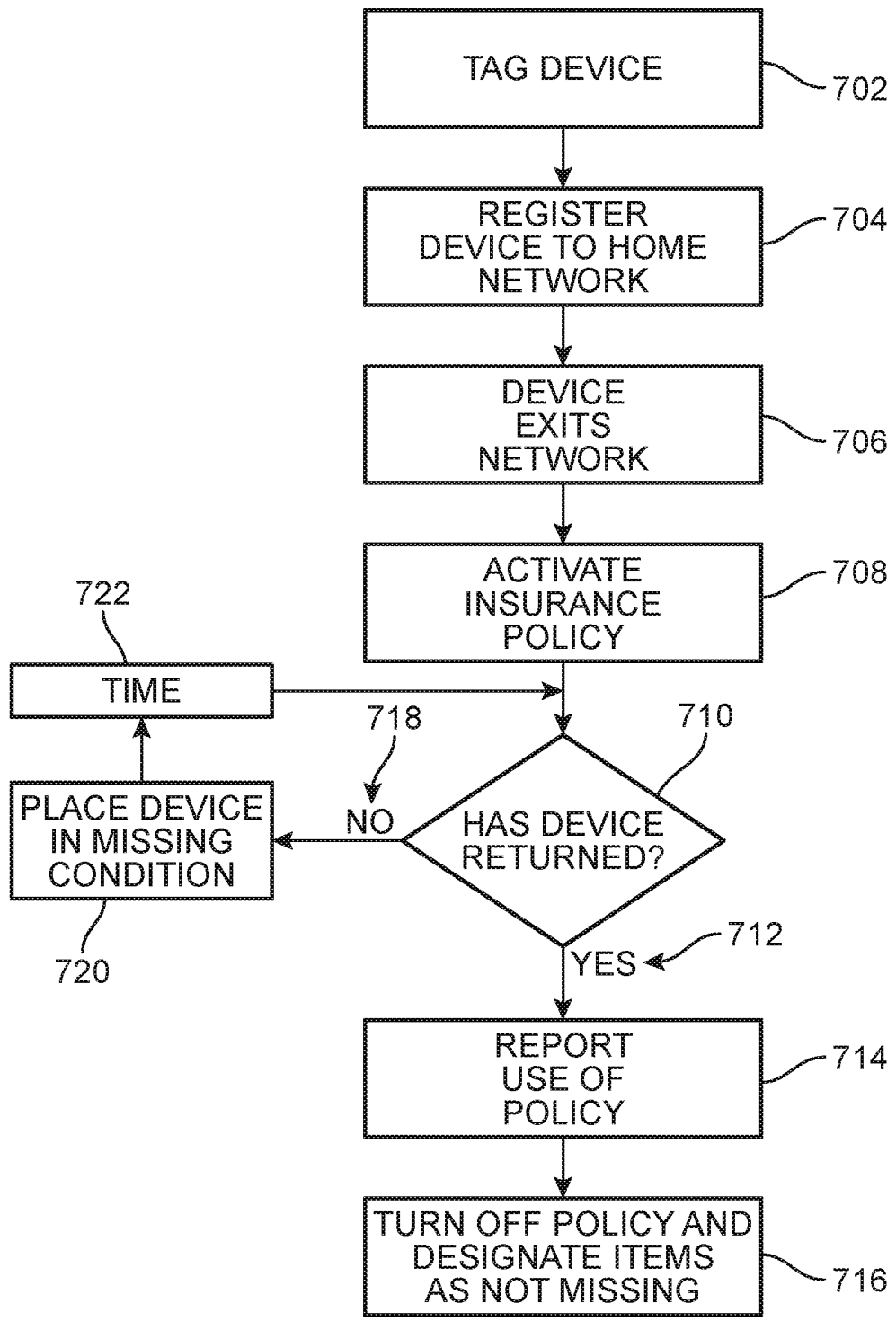
FIG. 7 is a flow diagram of an embodiment of a process of a system providing dynamic insurance.

FIG. 7 is a flow diagram of an embodiment of a process of a system providing dynamic insurance. In step 702, the process is initiated with user 402 configuring personal items 200 with wireless communication modules. User 402 may install tag 302 to personal items 200 or activate embedded or preexisting chip 304. In step 704, user 402 may register personal items 200 to home network 104. Personal items 200 may connect and communicate with home network 104 once registered. Personal items 200 may remain connected with home network 104 until personal items 200 exits home network boundary 104 (See FIG. 4). In step 706, personal items 200 exit home network boundary 104 and therefore personal items 200 lose their connection with home network 102.

In step 708, the dynamic insurance policy is activated after personal items 200 are disconnected from home network 102. In some embodiments, personal items 200 are insured during the time those items lose contact with home network 102. The system application associated with personal items 200 and home network 102 can be notified when personal items 200 disconnect from home network 102. In some cases, the system application can automatically activate the dynamic insurance policy when it receives this notification.

In step 710, the system application may recognize when personal items 200 return and reconnect to home network 102. In step 712, the system application may have recognized one or more personal items 200 that may have reconnected with home network 102. In step 714, the system application may report the use of the dynamic insurance policy. The system application may record the time personal items 200 were not connected to home network 102 and the dynamic insurance policy was activated.

In step 716, the system application may deactivate the dynamic insurance policy which can end that instance of insurance coverage for personal items 200. The system application may designate any personal items as "not missing" or "not lost" when personal items reconnect with home network 102.

In step 718, personal items 200 may not have re-entered home network boundary 102 and reconnected to home network 104. In step 720, the system application may place personal items 200 that have not reconnected with home network 104 in a designated missing condition. In one embodiment, the system application may categorize personal items 200 that are not connected to home network 102 in a missing condition immediately once personal items have exited home network boundary 102. In some embodiments, the system application may display the missing items on mobile device 602 (see FIG. 11). In another embodiment, the system application may categorize personal items 200 in a missing condition after a predetermined amount of time following the disconnection from home network 104. In another embodiment, the system application may categorize personal items 200 in a missing condition after some, but not all personal items 200 reconnect with home network 104.

In step 722, the system application may continue to categorize personal items 200 that have not reconnected to home network 104 in a missing condition for a predetermined period of time until missing personal items 200 have reconnected with home network 104. In some embodiments, the system application may record the amount of time that personal items have been disconnected. The recorded time may be used to determine that a personal item is likely never going to reconnect with home network 104 for various reasons. In another embodiment, the recorded time may also be used for determining the activity of the dynamic insurance policy if the process continues to step 716. Following step 722, the system application returns to step 710, where the system application may recognize when personal items 200 returned and reconnected to home network 102. The process will continue until the personal item eventually returns home in step 716 or until user 402 no longer possess one or more personal items 200. At this point, the user may submit an insurance claim through the system application.

Figure 8:
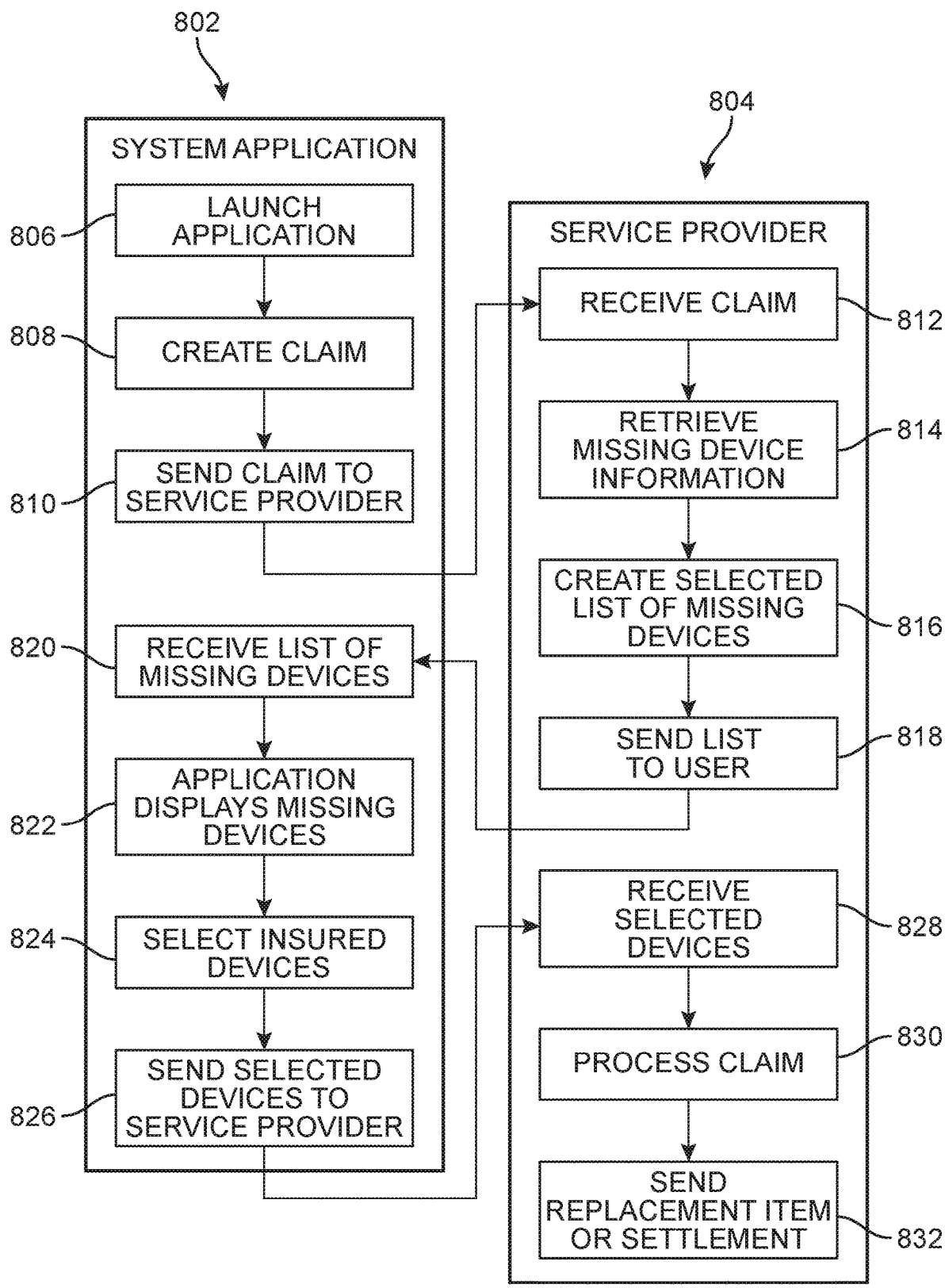
FIG. 8 is a flow diagram of an embodiment of a process of a system application function and communication with a service provider.

FIG. 8 is a flow diagram of an embodiment of a process of system application 802 as it functions and interacts with service provider 804. Service provider 804 may include a company that can provide various insurance coverages for personal items 200. In some embodiments, system application 802 and service provider 804 may communicate over a communication network to provide insurance claim service to user 402 when user 402 no longer possess personal items 200. In step 806, user 402 may use a device that can connect to a network, such as a mobile device 602 (see FIG. 6), to launch system application 802. In step 808, user 402 can use system application 802 to create an insurance claim for personal items 200. In step 810, user 402 can utilize system application 802 to send the insurance claim to the service provider 804.

In step 812, service provider 804 may receive the insurance claim that was sent from system application 802. In step 814, service provider 804 may access information provided by system application 802 and home network 102. Information provided by system application 802 may include the length of time personal items 200 were disconnected from the home network. Using this information, service provider 804 can determine the length of time the insurance policy was in use. In step 816, service provider 804 can use the information associated with personal items 200 to create a list of missing personal items 200. In step 818, service provider 804 can send the list of missing personal items 200 to system application 802. This list can be displayed for review by user 402.

In step 820, system application 802 may receive the list of missing devices sent by service provider 804. In step 822, system application 802 may display the list of missing personal items 200 on the mobile device 602 (See FIG. 12). In step 824, user 402 can select insured personal items 200 that may be included in the list of missing personal items 200. In step 826, user 402 can send the identity of the selected missing personal items 200 to service provider 804 for continued processing.

In step 828, service provider 804 may receive the selected missing personal items 200 from system application 802. In step 830, service provider 804 can process the insurance claim by using the information of selected missing personal items 200 provided by system application 802 and user 402. In step 832, service provider 804 may send a replacement for the identified missing personal items or send a settlement associated with the value and insurance coverage for missing personal items 200 (See FIG. 13).

Figure 9:
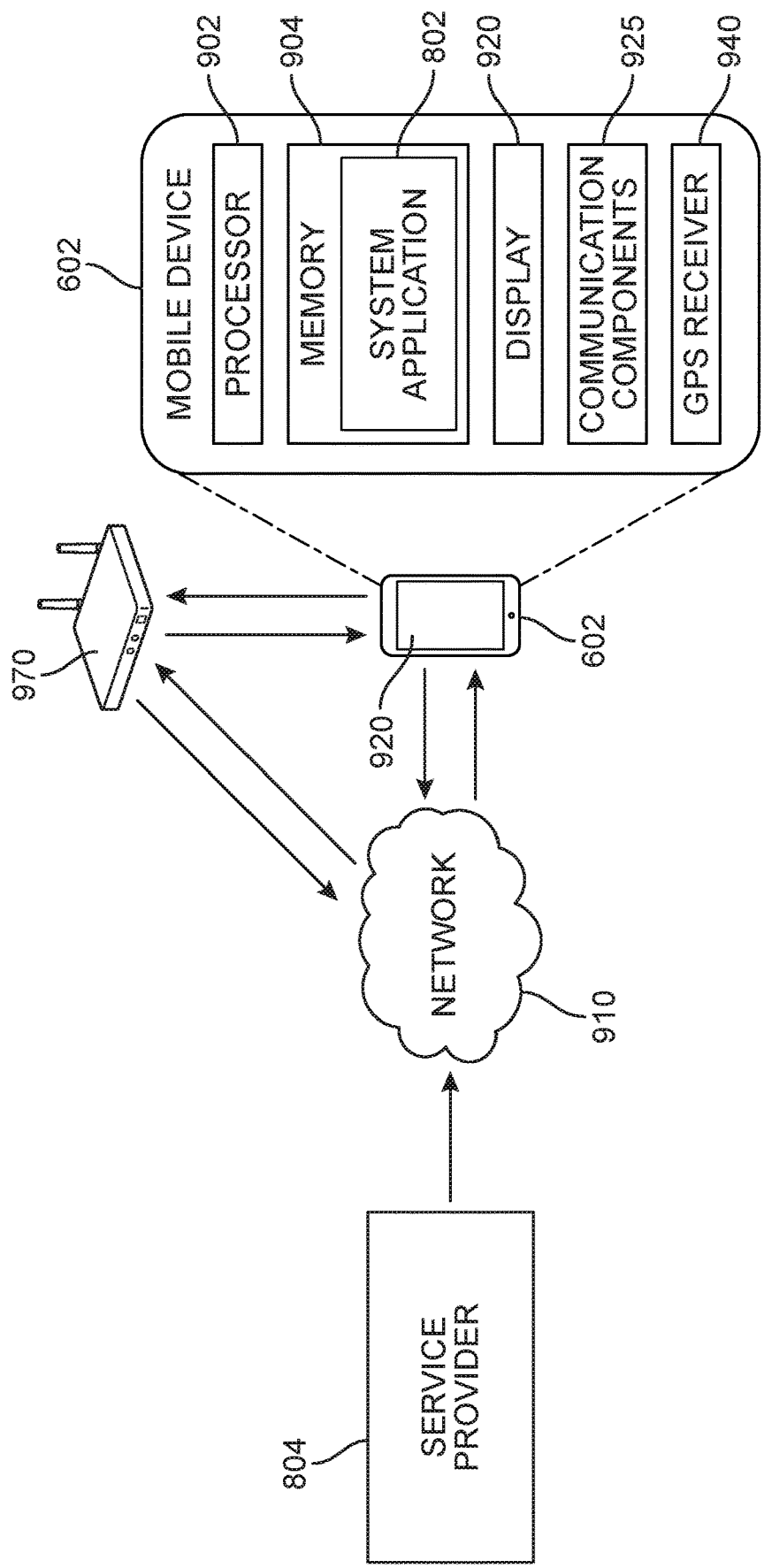
FIG. 9 is a schematic view of a system for performing the process of FIG. 8, according to an embodiment.

FIG. 9 is a schematic view of a mobile device 602. Exemplary mobile devices include, but are not limited to: cellular phones, smart phones, tablet computers, notebook computers, and e-book readers. Mobile device 602 may comprise a processor 902 and memory 904 for storing information, including software information and/or data. Memory 904 may include any type of storage, including Random Access Memory (RAM), micro-SD memory and Solid State Drives (SSD).

Mobile device 602 may also include various hardware components. For example, mobile device 602 may include display 920. In some embodiments, display 920 could be a touch-screen display that provides touch-based input.

Figure 10:
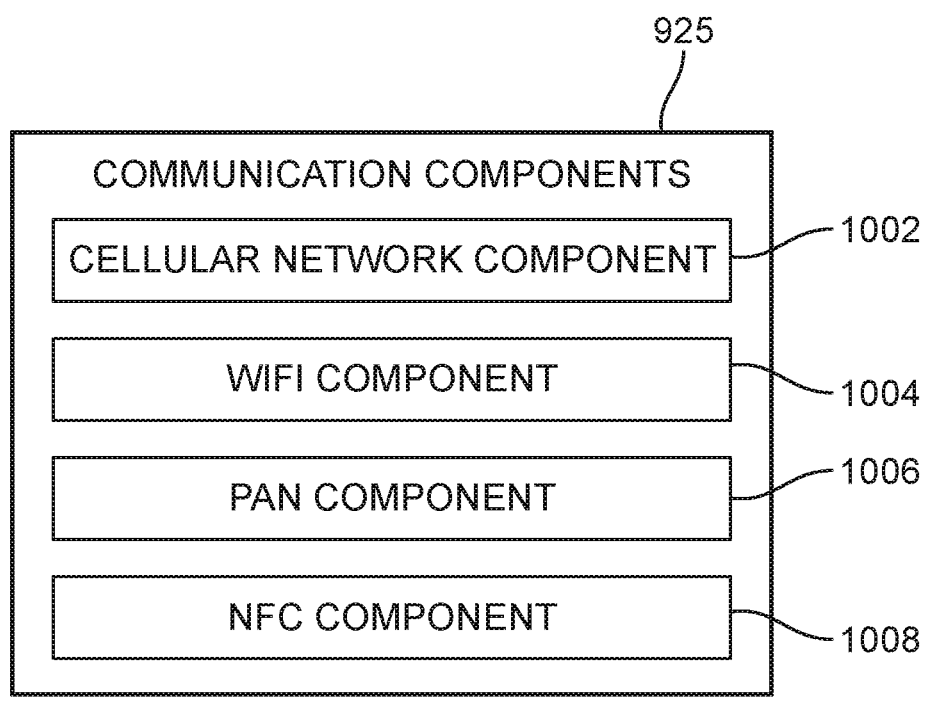
FIG. 10 is a schematic view of multiple different communication components, according to an embodiment.

Mobile device 602 may also include various communication components 925 configured to facilitate communication between mobile device 602 and other devices or computing systems over various kinds of networks. A set of exemplary communication components are depicted schematically in FIG. 10. These may include a cellular network component 1002, a Wi-Fi component 1004, a Personal Area Network (PAN) component 1006, and a Near Field Communication (NFC) component 1008. One or more of these components may function as radios within mobile device 602 for transmitting and receiving information in a specific radio band. In some embodiments, one or more of these components could be stand-alone hardware elements disposed in mobile device 602. In other embodiments, one or more of these components may be integrated components within a System on a Chip (SoC).

Cellular network component 1002 may comprise any hardware capable of communicating with other nodes in a cellular network. The components may be configured to communicate using one or more known cellular technologies such as Global System for Mobile Communications (GSM) and Code-Division Multiple Access (CDMA). In some cases, cellular network component 1002 may be incorporated as part of an SoC within mobile device 602.

Wi-Fi component 1004 may comprise any hardware capable of communicating with nodes in a wireless network using the IEEE 802.11 standards. In some cases, Wi-Fi component 1004 may comprise a wireless network interface controller (WNIC). In some cases, Wi-Fi component 1004 may be incorporated as part of an SoC within mobile device 602.

PAN component 1006 may comprise any hardware capable of communicating with nodes in a personal area network (PAN) and/or in a wireless personal area network (WPAN). PAN component 1006 may be configured for specific protocols such as Bluetooth. Other examples of WPANs include, but are not limited to: wireless USB and Zigbee. In some cases, PAN component 1006 may be incorporated as part of an SoC within mobile device 602. Moreover, in some cases, a single component can be operated for communicating over both Wi-Fi and personal area networks.

NFC component 1008 may comprise any hardware capable of communicating with another electronic device using any known near-field communication standards. In some cases, NFC component 1008 may be incorporated as part of an SoC within mobile device 602.

Still other embodiments can include provisions for communicating using various other kinds of networks, including wireless ad hoc networks (or mesh networks). For example, the Z-Wave protocol is a wireless ad hoc network that is used in home automation. As another example, Thread is a protocol for a low power mesh network for Internet of Things devices.

Mobile device 602 may include a hardware component for receiving any kind of global navigation satellite system (GNSS) information. As seen in FIG. 9, in one embodiment, mobile device 602 may include global positioning system (GPS) receiver 940. In some cases, GPS receiver 940 may be incorporated as part of an SoC within mobile device 602.

Mobile device 602 may send and receive information over one or more networks. As an example, mobile device 602 is indicated as communicating over a network 910 in FIG. 9. In some embodiments, network 910 may be a wide area network ("WAN"), e.g., the Internet. In other embodiments, network 910 may be a local area network ("LAN"). For example, in a more remote location far from a metropolitan area, the Internet may not be available. In yet other embodiments, network 910 may be a combination of a WAN and a LAN. Depending on the type of network, a suitable communications component may be used.

Mobile device 602 may communicate with a service provider 804. In some embodiments, mobile device 602 receives data and information from service provider 804. In some cases, the data and information could be sent over the internet. In other cases, the data and information could be sent through a wireless wide area network used by a cellular provider associated with mobile device 602.

The exemplary system can include system application 802 stored within memory 904. System application 802 may include any software, processes or services used in managing the power use of mobile device 602. In some embodiments, system application 802 may communicate with, and/or control, other hardware components, such as display 920, cellular network component 1002, Wi-Fi component 1004, PAN component 1006, NFC component 1008 and GPS receiver 940.

The exemplary system can also include components that communicate with home network 104. Router 970 can be configured with components to allow communication from home network 104 to mobile device 602 and network 910. Network 910 can allow service provider 804 to communicate with router 970, therefore allowing service provider 804 to retrieve missing personal items 200 information from home network 104 and system application 802 (Step 814).

Figure 11:
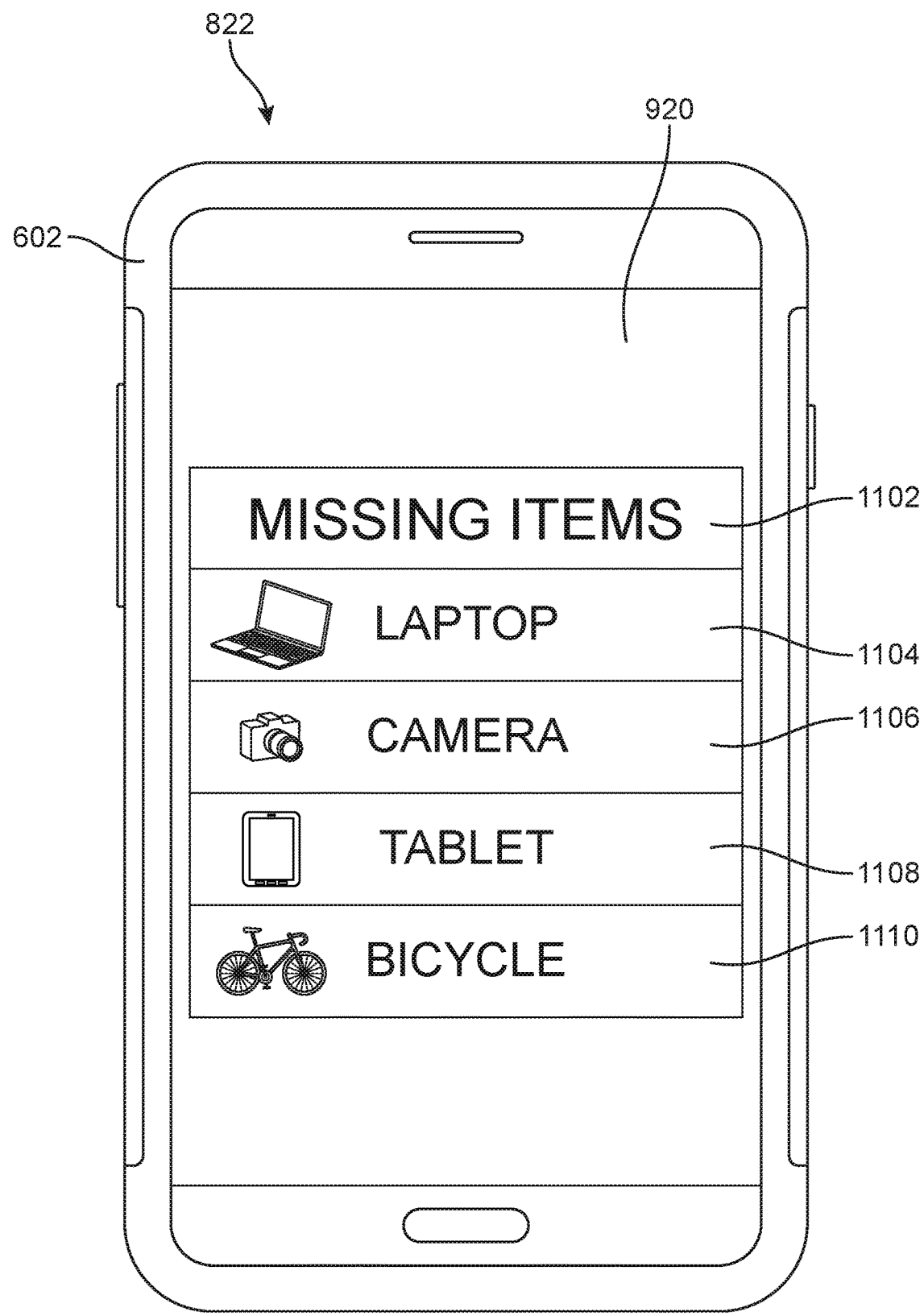
FIG. 11 is a schematic diagram of an embodiment of a mobile device with a display.

FIG. 11 is a schematic diagram of an embodiment of mobile device 602 with a display. In some embodiments, mobile device 602 may include a selective display 920 for missing items 1102 (Step 822, See FIG. 8). Display 920 may show personal items 200 as missing items 1102. As shown in FIG. 11, an example may include laptop computer 202 displayed in selective box 1104, DSLR camera 204 displayed in selective box 1106, tablet 206 displayed in selective box 1108 and bicycle 208 displayed in selective box 1110. In some embodiments, user 402 may select one or more missing personal items 200 from a list of all personal items 200 associated with system application 802 (Step 824).

Figure 12:
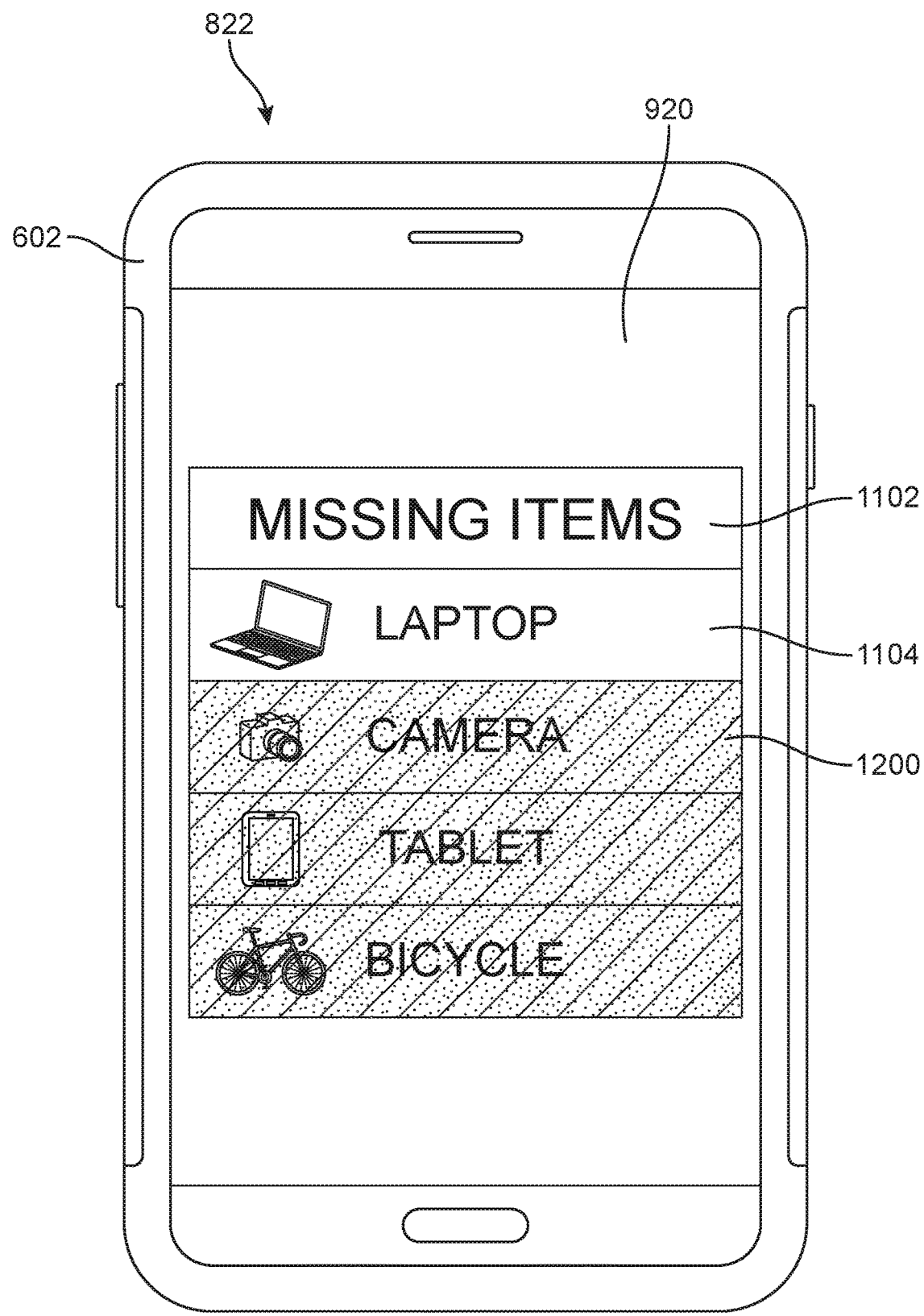
FIG. 12 is a schematic diagram of an embodiment of a mobile device with a display that is partially shaded.

In other embodiments, user 402 may select designated personal items 200 that are missing from the list of missing items 1102. FIG. 12 is a schematic diagram of an embodiment of mobile device 602 with display 920 that is partially shaded. For the embodiment in FIG. 12, display 920 may provide a selective feature to box 1104 but not to shaded area 1200. System application 802 may use data on missing personal items 200 to display missing items 1102 and include a shaded areal 200 over the display of items that are not designated as missing. In some embodiments, shaded area 1200 may show personal items that are associated with system application 802 but may not be configured with an interactive feature. In the example shown in FIG. 12, selective box 1104 may be selected by user 402 to confirm that laptop computer 202 is missing, while shaded area 1200 covers the boxes displaying DSLR camera 204, tablet 206, and bicycle 208 since they are not designated as missing (Step 824). These shaded boxes are not available for selection as missing items.

Figure 13:
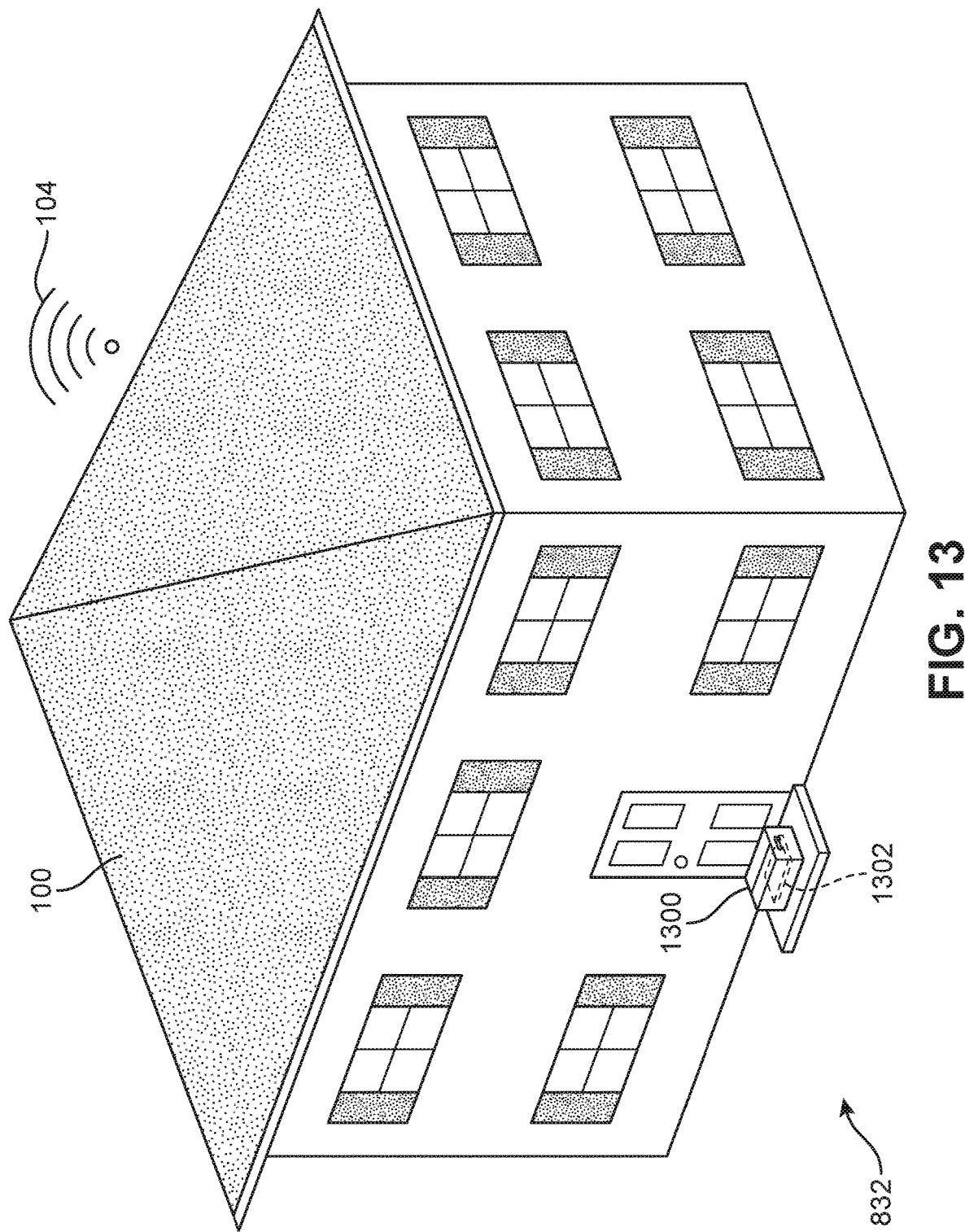
FIG. 13 is a schematic diagram of an embodiment of a replacement laptop computer.

FIG. 13 is a schematic diagram of an embodiment of a replacement laptop computer. Referring to step 832 of FIG. 8, service provider 804 may provide a replacement item for missing items 1102. An example may include user 402 submitting a claim for laptop computer 202 by using system application 802. The claim may be processed by service provider 804. In some embodiments, user 402 may receive package 1300 that contains replacement laptop 1302. In another embodiment, user 402 may receive a settlement associated with the value of laptop computer 202 that was covered by the insurance policy associated with system application 802 and service provider 804.

While various embodiments of the disclosure have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for tracking a plurality of personal items comprising:
   a tag device associated with each personal item of the plurality of personal items, wherein the tag device includes a wireless communication module;
   a home network associated with a house, the home network communicating with the wireless communication module of the tag device of each personal item of the plurality of personal items, the home network having a network boundary, the network boundary defining a communication limit of the home network;
   the system inferring a relative position of each personal item of the plurality of personal items by communicating with the wireless communication module of the tag device;
   wherein the system infers that each personal item of the plurality of personal items is within the network boundary of the home network when the wireless communication module of the tag device associated with the personal item is connected to the home network;
   wherein the system infers that each personal item of the plurality of personal items is beyond the network boundary of the home network and is located away from the house when the wireless communication module of the tag device associated with the personal item loses its connection to the home network;
   wherein the system determines that the wireless communication module of the tag device associated with at least a first personal item of the plurality of personal items and the wireless communication module of the tag device associated with a second personal item of the plurality of personal items that were previously within the network boundary of the home network have lost their connection to the home network together and are located away from the house;
   upon determining that at least the first personal item and the second personal item of the plurality of personal items have lost their connection to the home network together and are located away from the house, the system recognizing when the wireless communication module of the tag device associated with the first personal item reconnects with the home network, but the second personal item has not reconnected to the home network, then the system designating the first personal item as being in a not missing condition and categorizing the second personal item as being in a missing condition; and
   the system providing a list of missing items to a user of the system, wherein the list includes the second personal item designated as being in the missing condition;
   wherein the system automatically activates insurance coverage for each personal item of the plurality of personal items once the wireless communication module of the tag device associated with the personal item loses connection with the home network; and
   wherein the system automatically ends the insurance coverage for each personal item of the plurality of personal items once the wireless communication module of the tag device associated with the personal item reestablishes a connection to the home network.

2. The system according to claim 1, wherein the system further designates one or more personal items of the plurality of personal items as being in the missing condition when the wireless communication module of the tag device fails to communicate with the home network for a predetermined period of time.

3. The system according to claim 1, wherein the system further designates one or more personal items of the plurality of personal items as being in the missing condition when the wireless communication module of the tag device fails to communicate with the home network and the user selects the personal item as being lost or stolen.

4. The system according to claim 1, wherein the system sends a replacement item when one or more personal items of the plurality of personal items has been designated as being in the missing condition and the user has submitted an insurance claim with the system.

5. The system according to claim 1, further comprising the system recording an amount of time one or more personal items of the plurality of personal items have been disconnected from the home network.

6. The system according to claim 1, wherein the user may select one or more of the personal items on the list of missing items for processing to receive a replacement or settlement.

7. A method for tracking a plurality of personal items comprising:
  associating a tag device with each personal item of the plurality of personal items, wherein the tag device includes a wireless communication module;
  communicating with the wireless communication module of the tag device of each personal item of the plurality of personal items on a home network associated with a house, the home network having a network boundary, the network boundary defining a communication limit of the home network;
  determining, by a processor, a relative position of each personal item of the plurality of personal items by communicating with the wireless communication module of the tag device;
  determining, by the processor, that each personal item of the plurality of personal items is within the network boundary of the home network when the wireless communication module of the tag device associated with the personal item is connected to the home network; and
  determining, by the processor, that each personal item of the plurality of personal items is beyond the network boundary of the home network and is located away from the house when the wireless communication module of the tag device associated with the personal item loses its connection to the home network;
  determining, by the processor, that the wireless communication module of the tag device associated with at least a first personal item of the plurality of personal items and the wireless communication module of the tag device associated with a second personal item of the plurality of personal items that were previously within the network boundary of the home network have lost their connection to the home network together and are located away from the house;
  upon determining that at least the first personal item and the second personal item of the plurality of personal items have lost their connection to the home network together and are located away from the house, recognizing when the wireless communication module of the tag device associated with the first personal item reconnects with the home network, but the second personal item has not reconnected to the home network, then the processor designating the first personal item as being in a not missing condition and categorizing the second personal item as being in a missing condition; and
  providing a list of missing items to a user, wherein the list includes the second personal item designated as being in the missing condition;
automatically activating insurance coverage for each personal item of the plurality of personal items once the wireless communication module of the tag device associated with the personal item loses connection with the home network; and
automatically ending the insurance coverage for each personal item of the plurality of personal items once the wireless communication module of the tag device associated with the personal item reestablishes a connection to the home network.

8. The method according to claim 7, wherein one or more personal items of the plurality of personal items is further designated as being in the missing condition when the wireless communication module of the tag device fails to communicate with the home network for a predetermined period of time.

9. The method according to claim 7, wherein one or more personal items of the plurality of personal items is further designated as being in the missing condition when the wireless communication module of the tag device fails to communicate with the home network and the user selects the personal item as being lost or stolen.

10. The method according to claim 7, further comprising recording an amount of time one or more personal items of the plurality of personal items have been disconnected from the home network.

11. The method according to claim 7, further comprising selecting one or more of the personal items on the list of missing items for processing to receive a replacement or settlement.

12. A system for tracking a plurality of personal items comprising:
  a tag device attached to each personal item of the plurality of personal items, wherein the tag device includes a wireless communication module;
  a home network associated with a house, the home network communicating with the wireless communication module of the tag device of each personal item of the plurality of personal items;
  an application running on a mobile device;
  the application receiving information from a service provider;
  the service provider receiving notification when the wireless communication module of the tag device of each personal item of the plurality of personal items loses communication with the home network and the personal item is located away from the house;
  wherein the service provider determines that the wireless communication module of the tag device associated with at least a first personal item of the plurality of personal items and the wireless communication module of the tag device associated with a second personal item of the plurality of personal items that were previously connected to the home network have lost their connection to the home network together and are located away from the house;
    upon determining that at least the first personal item and the second personal item of the plurality of personal items have lost their connection to the home network together and are located away from the house, the service provider recognizing when the wireless communication module of the tag device associated with the first personal item reconnects with the home network, but the second personal item has not reconnected to the home network, then the service provider designating the first personal item as being in a not missing condition and categorizing the second personal item as being in a missing condition;
    the service provider creating a list of missing items that includes one or more personal items designed as being in the missing condition, the list of missing items including the second personal item, and sending the list of missing items to the application;
    the application displaying the list of missing items;
    the application receiving a selection made by a user of the application designating one or more personal items included in the list of missing items as being lost or stolen; and the service provider receiving, from the application, the selection made by the user designating the one or more personal items as being lost or stolen;

wherein the service provider issues a dynamic insurance policy when the service provider receives the notification that the wireless communication module of the tag device associated with one or more personal items of the plurality of personal items has lost its connection with the home network; and wherein the service provider ends the dynamic insurance policy when the service provider determines that the wireless communication module of the tag device associated with the one or more personal items of the plurality of personal items has reestablished a connection to the home network.

13. The system according to claim 12, wherein the system sends a replacement item when one or more personal items of the plurality of personal items has been designated as being in the missing condition and the user has submitted an insurance claim with the system.

14. The system according to claim 12, wherein the replacement item is sent to an address of the house associated with the home network.

15. The system according to claim 12, wherein the application allows selection of selected personal items included in the list of missing items and prevents the selection of other personal items.

16. The system according to claim 12, wherein the application detects a connection to the home network.

* * * * *